United States Patent [19]
Pientka et al.

[11] Patent Number: 5,694,012
[45] Date of Patent: Dec. 2, 1997

[54] DEVICE FOR OPERATING A WINDSHIELD WIPER IN INTERMITTENT AND CONTINUOUS MODES

[75] Inventors: Rainer Pientka, Achern; Henry Blitzke, Buehl, both of Germany

[73] Assignee: Robert Bosch GmbH, Stuttgart, Germany

[21] Appl. No.: 687,340

[22] PCT Filed: Jan. 24, 1995

[86] PCT No.: PCT/DE95/00082

§ 371 Date: Aug. 1, 1996

§ 102(e) Date: Aug. 1, 1996

[87] PCT Pub. No.: WO95/21078

PCT Pub. Date: Aug. 10, 1995

[30] Foreign Application Priority Data

Feb. 5, 1994 [DE] Germany ............... 44 03 661.2

[51] Int. Cl.[6] .................................................. B60S 1/08
[52] U.S. Cl. .................................. 318/444; 318/483
[58] Field of Search ............................ 318/443, 444, 318/DIG. 2, 480, 483

[56] References Cited

U.S. PATENT DOCUMENTS

| | | | |
|---|---|---|---|
| Re. 35,422 | 1/1997 | Levers | 318/444 |
| 3,786,330 | 1/1974 | Inoue et al. | 318/483 |
| 4,317,073 | 2/1982 | Blaszkowski | 318/483 |
| 4,339,698 | 7/1982 | Kearns | 318/444 |
| 4,916,374 | 4/1990 | Schierbeek et al. | 318/483 |
| 5,059,877 | 10/1991 | Teder | 318/444 |

FOREIGN PATENT DOCUMENTS

| | | |
|---|---|---|
| 63-078849 | 8/1988 | Japan . |
| 2-068249 | 3/1990 | Japan . |

*Primary Examiner*—Bentsu Ro
*Attorney, Agent, or Firm*—Spencer & Frank

[57] ABSTRACT

Proposed is a device for operating a windshield wiper in the intermittent and continuous modes. To do this, at least one sensor (12) is provided, which emits signals in dependence on the coat of moisture or the amount of rain on a windshield to be cleaned, as well as an electronic control (16) for operating the windshield wiper (11) in dependence of the signal from sensor (12). The number for the sensor signals (E) per wiping interval (WP) is recorded as control signal (n) in one evaluating mechanism (14). Furthermore and depending on whether at least one threshold value (S1, S2) is exceeded or not reached by the control signal (n) or a signal (M1, M2), derived from control signals, there is a changeover between intermittent and continuous modes by means of a changeover device (21, 22).

20 Claims, 6 Drawing Sheets

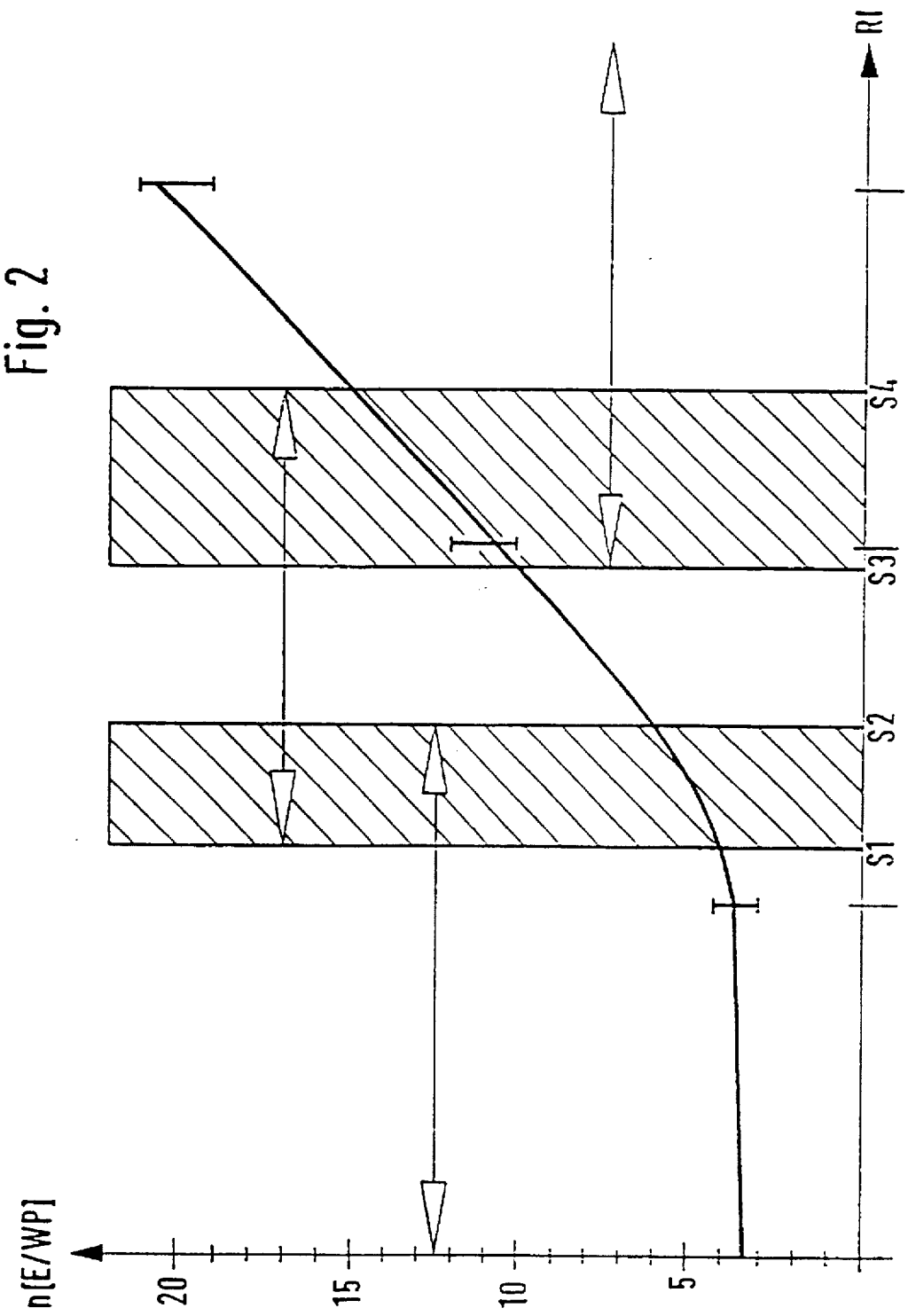

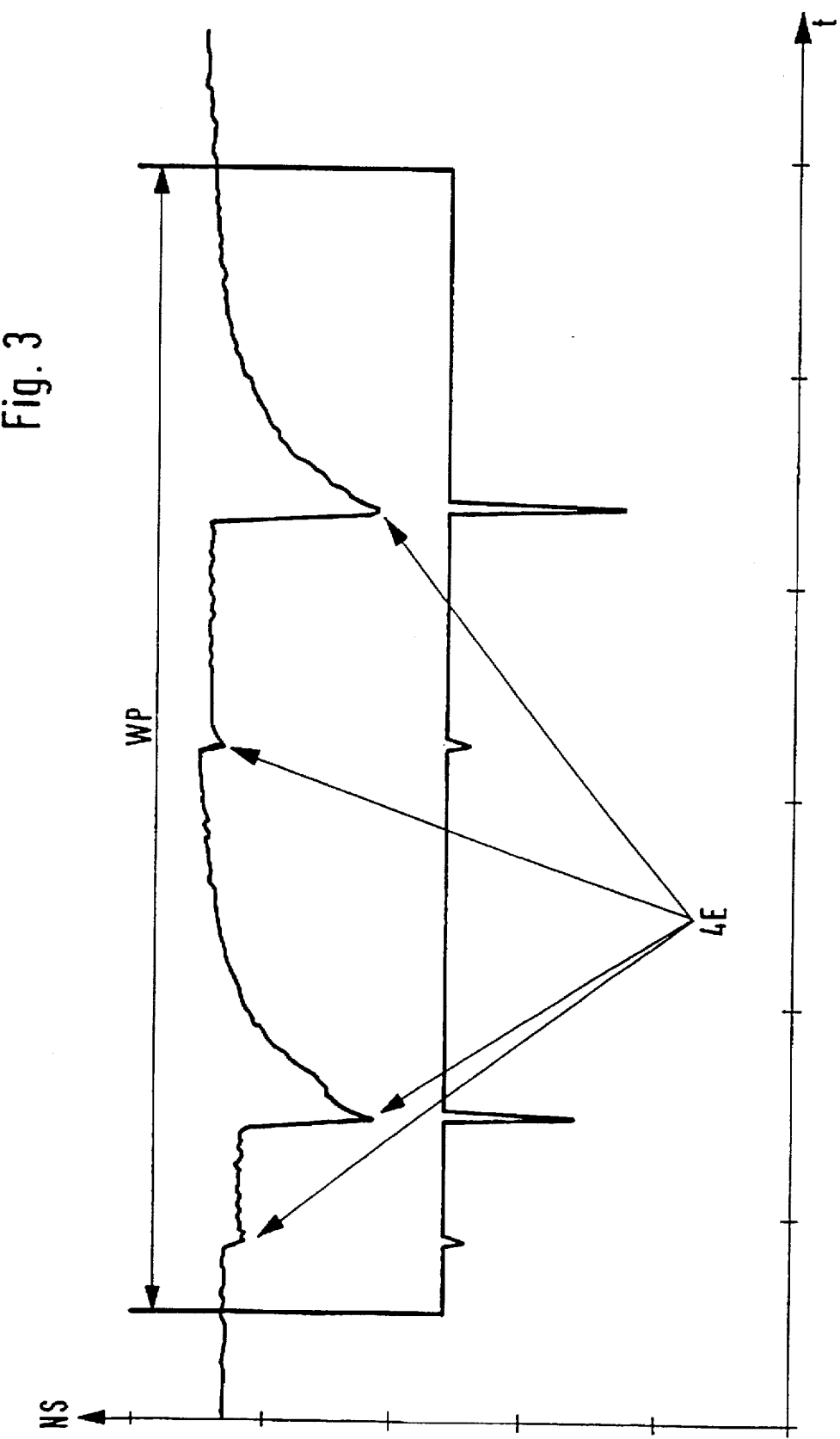

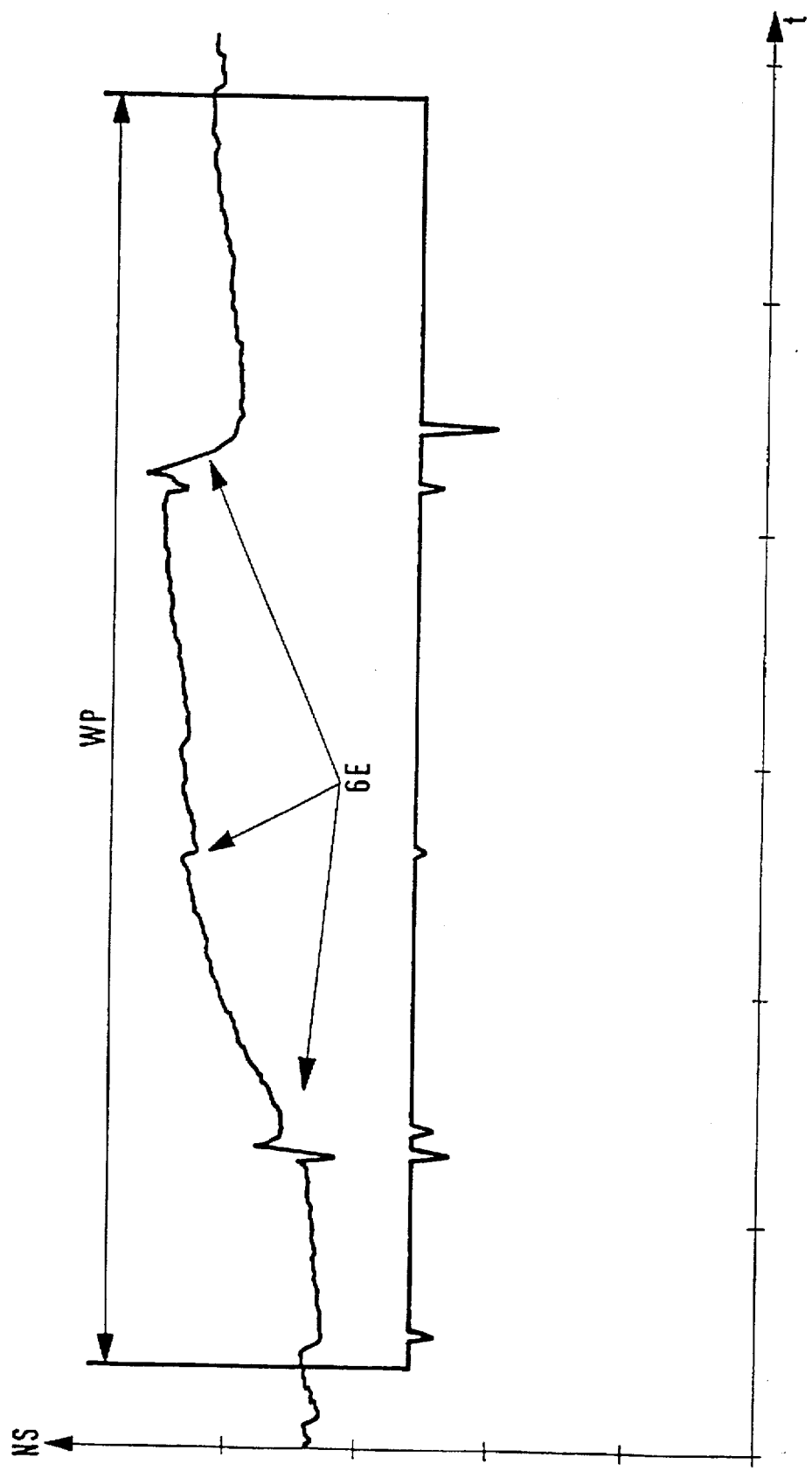

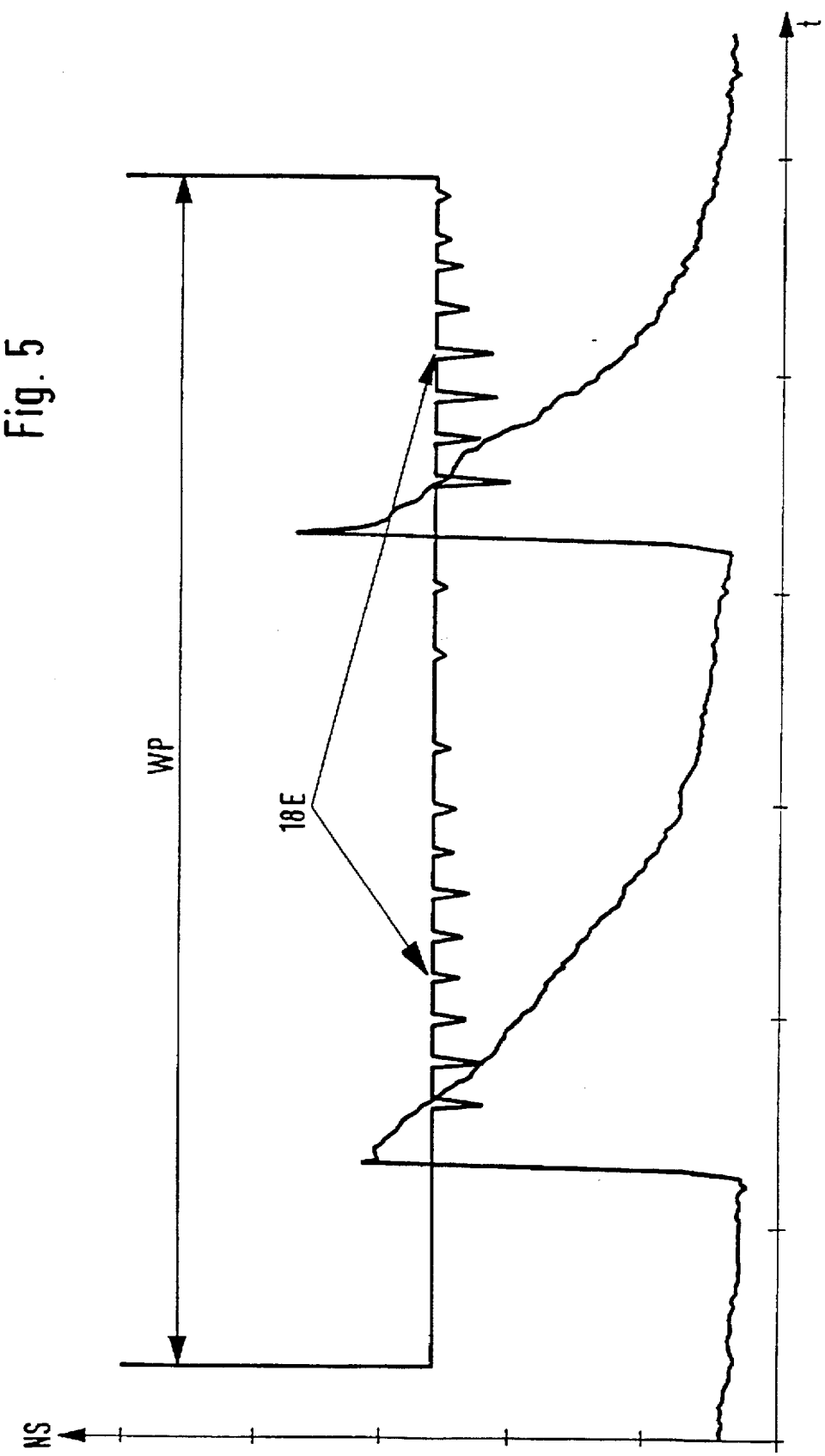

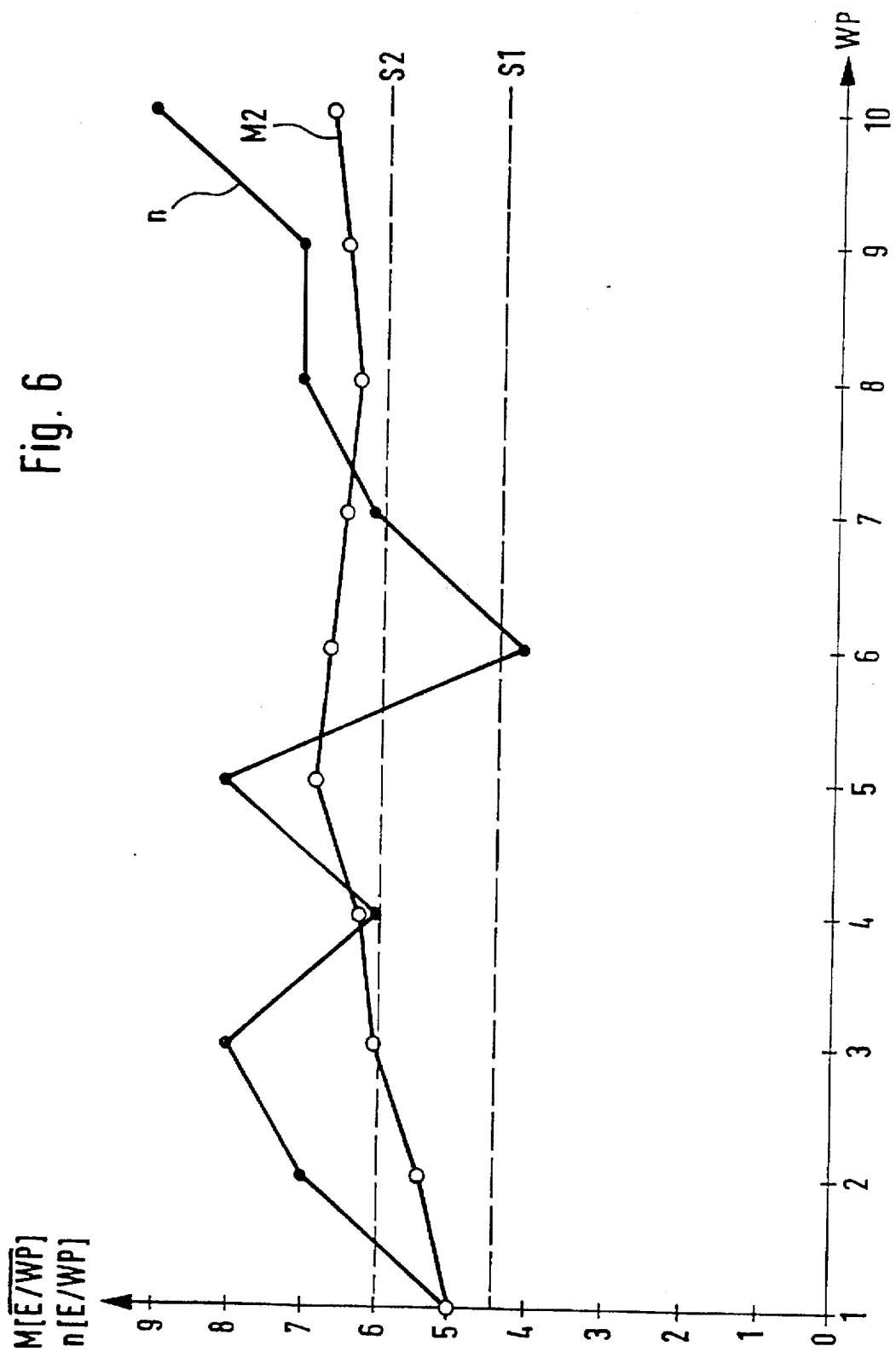

DEVICE FOR OPERATING A WINDSHIELD WIPER IN INTERMITTENT AND CONTINUOUS MODES

BACKGROUND OF THE INVENTION

This invention concerns a device for operating a windshield wiper in intermittent and continuous modes, and more particularly to a windshield wiper of the type with at least one sensor that emits signals depending on the moisture coating or amount of rain on the windshield to be cleaned, and with an electronic control for controlling the windshield wiper operation in dependence on the sensor signals.

During constantly changing rain density, for example, it is bothersome and complicated for the driver of a motor vehicle to actuate time and again a changeover device, in order to adapt the windshield wiper operation to the actual rain density. An automatic changeover device was therefore proposed in DE 40 18 903 C2 already, for which the interval between sequential wiping operations is influenced in dependance on the number of signals emitted by the sensor, for example relative to the signals that occur within a given time segment. Above a certain number of signals, the windshield wiper is switched to the continuous mode.

Thus, no direct changeover between intermittent and continuous mode takes place, but an indirect changeover via the control of the interval between the various wiping operations. This leads to a relatively involved control and a relatively inexact changeover between intermittent and continuous mode. Another problem is that no calculated "interval time" exists in the continuous mode, which can be used as criterium for the transition between continuous/intermittent mode.

SUMMARY OF THE INVENTION

The device according to the invention, with the essential characteristics, has the advantage of recording the rain density very accurately and that a simple and precise evaluating device as well as a changeover device between intermittent and continuous mode can be realized.

In accordance with the invention, this advantage can be attained by providing a windshield wiper which is characterized in that it has an evaluation mechanism, which records the number of sensor signals per wiping interval as a control signal, and a changeover device that switches between intermittent and continuous modes depending on whether at least one threshold valve is exceeded or not reached by the control signal or a signal that is derived from control signals.

It is preferable if the wiping intervals provided for the generating of control signals are wiping cycles, so that on the one hand, the rain density is recorded over a relatively long period of time and, on the other, the synchronizing signals for such wiping cycles already exist in the form of control signals for the motor control.

It is advantageous if water-induced signal breaks of the sensor output signal are used as sensor signals for further evaluation. Such signal breaks can develop as a result of rain drops hitting, of the wet wiper blade gliding across the sensor surface, or rapidly changing surface textures, e.g. very heavy streaking.

The individual signal breaks are no longer as distinctive at higher rain density, but the sensor output signal is essentially weakened continuously because of the high number of these breaks. Thus, in order to form the control signal during higher rain density, means for recording the sensor output signal decline are provided, which divide especially the declining sensor output signal into small time intervals, wherein the respective signal decline during one such small time interval is rated as at least one signal break.

Appropriately, a counting device for recording the sensor signal per evaluation interval is provided.

The number of signal breaks per wiping cycle may fluctuate considerably. In order to prevent a constant changeover between continuous and intermittent mode, the evaluating device has a mechanism for taking the mean of a fixed number of successive control signals, wherein the mean values form the actual control signals. It makes sense to take the mean after each wiping cycle, e.g. a mean is taken for the preceding five wiping cycles.

However, so that the evaluating device does not react too slowly to changes in the rain density, each of the control signals, obtained from preceding wiping cycles, is associated during the averaging with predetermined weighting factors, wherein it makes sense to give a lower rating to the wiping cycles that date farther back.

Another advantageous measure for preventing a constant changeover between continuous and intermittent modes consists in providing two threshold values for forming a changeover hysteresis for the changeover between intermittent and continuous mode. In an even more comfortable embodiment, it is possible to have at least partially varied weighting factors to generate a first effective control signal for the transition from continuous mode to intermittent mode and a second effective control signal for the transition from intermittent to continuous mode. These measures are designed to ensure a quick transition to the continuous mode and a lingering in this mode, if required by the rain situation.

Frequently, different continuous modes with varied wiper speeds are planned for windshield wipers. The invention can also extend to the changeover between such varied continuous modes, wherein at least one additional threshold value is provided for changing between a first continuous mode and a second continuous mode with higher wiping speed. It is more advantageous to provide two additional threshold values for forming a changeover hysteresis for the changeover between the first and second continuous mode.

A further improvement can be achieved by providing means for the evaluation of the signal break depth. The depth of these signal breaks can effectively be provided as weighting factor for the control signals.

BRIEF DESCRIPTION OF THE DRAWINGS

One exemplary embodiment of the invention is shown in the drawings, in which:

FIG. 2 is a signal diagram for explaining the connections between rain intensity RI, recorded breaks per wiping cycle, and changeover processes between modes;

FIG. 3 is a signal diagram for explaining the conditions at low rain intensity;

FIG. 4 is a signal diagram for explaining the conditions at medium rain intensity;

FIG. 5 is a signal diagram for explaining the conditions during high rain intensity; and FIG. 6 is a signal diagram for explaining the weighted averaging.

DESCRIPTION OF THE EXEMPLARY EMBODIMENT

Figure 1:
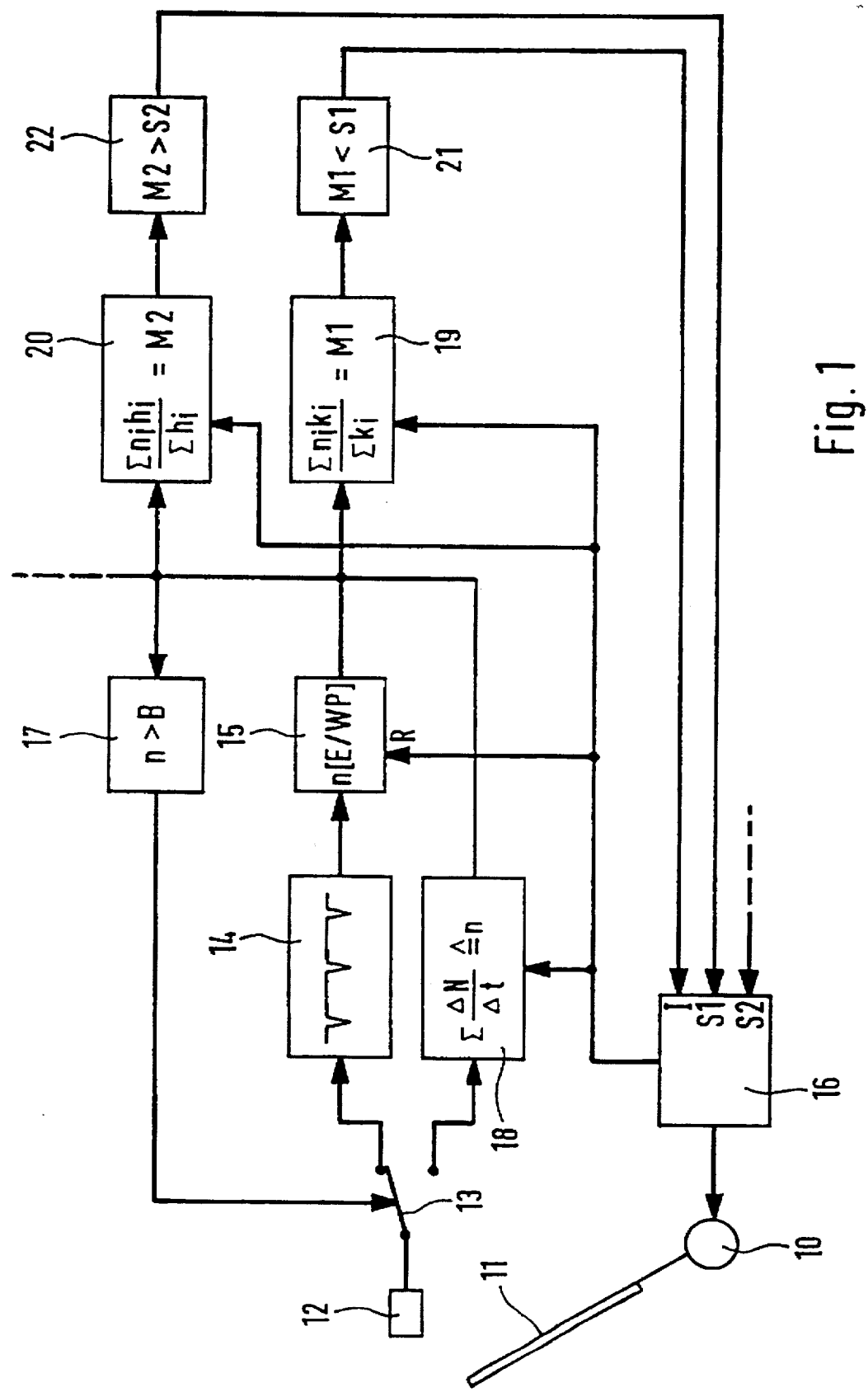
FIG. 1 is a block diagram of an exemplary embodiment of the invention.

In accordance with the exemplary embodiment of a windshield wiper system shown in FIG. 1, a windshield wiper 11, operated in the standard way by a wiper motor 10, moves across a windshield that is not shown, for example the front windshield or rear window of a motor vehicle. A rain sensor 12 is installed on this windshield or window, e.g. as is known from DE-PS 23 54 100 or DE 41 02 146 A1. With such rain sensors, for example, the light transmitted by a light source is reflected on the windshield outside and recorded or measured by a light meter. Dirt particles or rain drops on the windshield weaken the reflection, which leads to a weakening of the signal in the light meter.

The output signal for rain sensor 12 is transmitted via a changeover device 13 in the displayed switching position to a first evaluating mechanism 14, where signal breaks from rain sensor 12 are converted to counting signals for the subsequent counter 15. These signal breaks represent a measure of the rain intensity RI and, among other things, are caused by the following:

1. Striking rain drops, whereby the break depth represents a coarse measure for the drop size;
2. Breaks, caused by the (wet) wiper blade moving back and forth in cycles across the sensor surface; and
3. Rapidly changing surface textures (e.g. very heavy streaking).

Starting at a minimum depth, each signal break is here processed as a counting signal for counter 15. This counter 15 is synchronized through an electronic control 16 for wiper motor 10, meaning that counter 15 is reset at the beginning of each wiping cycle, so that a number value, which corresponds to number n for breaks E per wiping cycle WP, is present in counter 15 at the end of each counting cycle. This number value N is used further as control value N.

In FIGS. 3 to 5, the conditions are shown for low, average, and high rain intensity RI. With low rain intensity according to FIG. 3, four breaks of useful signal NS of rain sensor 12 are recorded during one wiping cycle. The two smaller breaks are caused by rain drops, while the two larger breaks are caused by the wiper moving across the rain sensor 12. The relatively slow signal rise following the two wiping passages is caused by evaporating streaks. According to FIG. 2, the intermittent mode is activated during those conditions.

In FIG. 4, the conditions are shown for average rain intensity, and six breaks are recorded during one wiping cycle WP. According to FIG. 2, the intermittent mode or stage 1 of the continuous mode can be activated up to this rain intensity, wherein this range between four and six breaks per wiping cycle is shown as hatched area on the left.

FIG. 5 shows the conditions for high rain intensity, and eighteen breaks per wiping cycle are registered. While the wiper moves twice across the sensor, useful signal NS of the rain sensor recovers briefly (steep rise), only to be weakened again immediately by hitting rain. During this rain density, the signal is weakened continuously, and the individual breaks are barely detectable. The high rain intensity is detected in a switching stage 17, and an output signal is generated if, for example, the number n of breaks per wiping cycle is higher than nine. In that case, changeover device 13 is switched via the switching stage 17, and the useful signal of rain sensor 12 is then fed into a second evaluating mechanism 18. There, the signal is divided into small time segments $\Delta t$, and the signal decline $\Delta N$ in the respective time internal $\Delta t$ is counted as a break. The steepness of the signal weakening here is a function of the resulting number of breaks. These are added up for each wiping interval in the second evaluating mechanism 18, wherein such an adding up on principle could also take place in the counter 15. The continuous mode is always activated during such high rain intensity and, according to FIG. 2, the continuous mode is in stage 2, meaning it has a higher wiping speed as compared to stage 1.

The control signals n are then supplied to two stages 19, 20 for taking the mean. That is, according to FIG. 6 (curve n with filled-in marks as measuring points), the number of breaks per wiping cycle can fluctuate considerably. Among other things, this is caused by rain drops hitting the measured section at random times and the changing rain conditions, e.g. strong wind, which deposits varied amounts of water onto the windshield, or water sprayed from preceding vehicles. In order to prevent a constant change between continuous and intermittent mode, the weighted arithmetic mean M1 or M2 of a number i of control signals n is formed by preceding wiping cycles:

$$M1 = \frac{\Sigma n_i \cdot k_i}{\Sigma k_i}$$

$$M2 = \frac{\Sigma n_i \cdot h_i}{\Sigma h_i}$$

i=1 ... 5

The weighting factor k or h achieves that control signals from wiping cycles dating farther back can be evaluated differently, for example rated lower. In this case, for example, i=5 preceding wiping cycles are taken into account.

FIG. 6 shows the control signals N over ten wiping cycles and respectively formed mean values M2, which are formed in each case from the control signals of the respectively last five wiping cycles. The formation of mean values M1 or M2, on the other hand, is synchronized with the wiping cycle control.

The mean values M1 and M2 serve as effective mean values and are supplied to two threshold value stages 21, 22 respectively. In this case, the mean value M1 serves as a control signal for the changeover to the intermittent mode, which takes place if a lower threshold value S1 is not reached. The first threshold value stage 21 then generates a control signal for the interval input I of the electronic control 16. The mean value M2, on the other hand, serves as control signal for the changeover to the continuous mode (stage 1), which takes place if a higher threshold value S2 is exceeded. In that case, the second threshold value stage 22 generates a control signal for input S1 of the electronic control 16 for changeover to the continuous mode (stage 1). As a result of this, a hysteresis is achieved during the changeover, which effectively prevents a constant switching back and forth between the two operational modes.

There is a corresponding changeover between stages 1 and 2 of the continuous mode, for which two additional stages for averaging and two further threshold value stages, which are not shown, are needed. In the diagram, this is shown by a dashed line. Of course, even more stages can be provided on principle.

The differences in weighting, for example, can be taken into account in that the control signals for the wiping cycles dating farther back are weighted less for the changeover from intermittent to continuous mode, while an even weighting is used for the changeover from continuous to intermittent mode. In a simpler embodiment, this varied weighting can be dispensed with so that only one single stage is necessary for taking the mean. This single stage can, for example, also effect the averaging for generating an effective control signal for the changeover between the various stages of the continuous mode. Furthermore, in a less complicated exemplary embodiment, the hysteresis can be dispensed with and only one single threshold value provided for the changeover between intermittent and continuous mode. The same is true for the changeover between the various stages of the continuous mode.

If, for example, a second stage of the continuous mode is dispensed with, then the first evaluating mechanism 14 is sufficient for the changeover between intermittent and continuous mode, and the second evaluating mechanism 18 can be dispensed with.

On the other hand, in a more involved embodiment, the depth of the signal breaks can also be used as additional evaluation of the rain situation and as further influencing variable for the weighting factors h or k.

The electronic control 16, at least for the intermittent mode, can be activated manually or even automatically, e.g. immediately after the rain sensor 12 records a rain drop.

As alternative to the arrangement in FIG. 1, the two evaluating mechanisms 14, 18 can also be designed as one single evaluating mechanism. In that case, the external changeover device 13 and the external switching stage 17 are no longer needed. A time window is always determined for a recognized signal break in this combined evaluating mechanism. Starting with a resulting signal break depth, in particular in the case of a continuous signal weakening, the signal decline detected in the time window is counted as a signal break.

What is claimed is:

1. An improved device for operating a windshield wiper in the intermittent and continuous modes, the device having at least one sensor that emits signals, depending on the moisture coating or the amount of rain on a windshield to be cleaned, and having an electronic control system for controlling the windshield wiper operation in dependence on the sensor signals, wherein the improvement comprises:

the electronic control system includes evaluating mechanism means (14) for recording the number of sensor signals (E) per wiping interval (WP) as a control signal, and changeover device means (21, 22) for switching between the intermittent mode and the continuous mode, depending on whether at least one threshold value (S1, S2) is exceeded or not reached by the control signal (n) or a signal (M1, M2) that is derived from control signals.

2. A device according to claim 1, wherein wiping intervals (WP), used to generate control signals (n), are wiping cycles.

3. A device according to claim 1, wherein the evaluation mechanism means evaluates water-induced signal breaks (E) of the sensor signals (NS).

4. A device according to claim 3, wherein each signal break has a depth corresponding to an amount of water sensed by the at least one sensor, and wherein means for evaluating the depth of the signal breaks (E) are provided.

5. A device according to claim 4, wherein the depth of the signal breaks (E) is entered into weighting factors for the control signals (n).

6. A device according to claim 1, wherein, in order to generate the control signal (n) at higher rain density, means (18) for recording a decline of the sensor signals (NS) are provided.

7. A device according to claim 6, wherein the means (18) for recording a decline are designed to produce time intervals ($\Delta t$), wherein each time, the signal decline ($\Delta n$) during such a time interval ($\Delta t$) is rated as at least one signal break.

8. A device according to claim 1, wherein a counter (15) for recording the sensor signals (E) per evaluation interval (WP) is provided.

9. A device according to claim 1, wherein the evaluation mechanism means (14) contains a device (19, 20) for taking the average of a number of successive control signals (n) to form the effective control signals.

10. A device according to claim 9, wherein the device (19, 20) for taking the average is designed to take the control signal mean after each wiping interval (WP).

11. A device according to claim 9, wherein each of the control signals (n) from preceding wiping intervals (WP), is linked during the averaging with weighting factors ($h_i$, $k_i$) that can be predetermined.

12. A device according to claim 11, wherein at least partially varied weighting factors ($k_i$, $h_i$) are provided for generating a first effective control signal (M1) for the changeover from the continuous mode to the intermittent mode and a second effective control signal (M2) for the changeover from the intermittent mode to the continuous mode.

13. A device according to claim 1, wherein two threshold values (S1, S2) are provided for forming a changeover hysteresis for switching between the intermittent and continuous modes.

14. A device according to claim 13, wherein at least one additional threshold value (S3, S4) is provided for switching between a first continuous mode and a second continuous mode with higher wiper speed.

15. A device according to claim 14, wherein two other threshold values (S3, S4) are provided for forming a changeover hysteresis for the changeover between the first and second continuous mode.

16. A device according to claim 1, wherein each wiping interval is a wiping cycle, during which the windshield wiper moves across the at least one sensor twice.

17. A device for operating a windshield wiper, comprising:

a sensor to sense water on the windshield and generate a sensor signal in response thereto;

a motor, operatively connected to the windshield wiper, to move the windshield wiper back and forth in windshield wiper cycles;

an electronic control unit to drive the motor in an intermittent mode or a continuous mode in response to control unit input signals; and means for generating the control unit input signals in response to the sensor signal, the means for generating including evaluating means for evaluating the sensor signal during each of a sequence of windshield wiper cycles to ascertain the amount of water sensed in each windshield wiper cycle of the sequence.

18. A device according to claim 17, wherein the means for generating further includes means for finding a weighted average, of the amount of water sensed during a plurality of consecutive windshield wiper cycles, using weighting factors assigned to the plurality of consecutive windshield wiper cycles, at least one of the weighting factors having a value that is different from that of at least one other of the weighting factors.

19. A device according to claim 17, wherein the evaluating means comprising means for counting water-induced signal breaks in the sensor signal during each windshield wiper cycle when rainfall is light.

20. A device according to claim 19, wherein the evaluating means comprises means for measuring incremental changes in the sensor signal during each windshield wiper cycle when rainfall is heavy.

* * * * *